(12) United States Patent  
Margalit et al.

(10) Patent No.: US 9,689,695 B2
(45) Date of Patent: Jun. 27, 2017

(54) MEETING POINT DETERMINATION FOR GROUP MEMBERS

(71) Applicant: Empire Technology Development LLC, Wilmington, DE (US)

(72) Inventors: Mordehai Margalit, Zichron Ya'aqov (IL); Yehuda Binder, Hod-HaSharon (IL); Vlad Dabija, Mountain View, CA (US); Natalya Segal, Even Yehuda (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/491,937

(22) Filed: Sep. 19, 2014

(65) Prior Publication Data

US 2016/0084664 A1    Mar. 24, 2016

(51) Int. Cl.
*G01C 21/34*    (2006.01)
(52) U.S. Cl.
CPC ................... *G01C 21/3438* (2013.01)
(58) Field of Classification Search
CPC .................................................. G01C 21/3438
USPC .......................................................... 701/410
See application file for complete search history.

(56) References Cited

U.S. PATENT DOCUMENTS

| | | | |
|---|---|---|---|
| 7,027,995 B2 | 4/2006 | Kaufmann et al. | |
| 8,239,127 B2 | 8/2012 | Kono et al. | |
| 2008/0231507 A1* | 9/2008 | Burckart | G01C 21/20 342/357.52 |
| 2009/0017803 A1* | 1/2009 | Brillhart | G01C 21/20 455/414.2 |
| 2011/0113148 A1* | 5/2011 | Salmela | G01C 21/3438 709/229 |
| 2011/0191019 A1* | 8/2011 | Holsinger | G01C 21/00 701/533 |

(Continued)

FOREIGN PATENT DOCUMENTS

JP    2002092788 A    3/2002

OTHER PUBLICATIONS

"Genetic algorithm," Accessed at http://web.archive.org/web/20040314155818/http://en.wikipedia.org/wiki/Genetic_Algorithm, last modified on Feb. 10, 2004, pp. 3.

(Continued)

*Primary Examiner* — Aaron L Troost
(74) *Attorney, Agent, or Firm* — Turk IP Law, LLC

(57) ABSTRACT

Technologies are generally described to coordinate group members that may be at distinct locations and optionally moving in distinct directions to meet at a coordinated meeting point and/or to move in a common direction. A coordinated meeting point may optimize a parameter of interest for each of the group members or group as a whole. Example parameters may include distance, time, fuel usage, remaining resource levels, a network coverage, and group members' patience, mood, and/or tiredness factors. In some examples, a controller may determine the meeting point that minimizes a parameter of interest for the group members or whole group, where the meeting point may be stationary or dynamic. The controller may map the calculated meeting point to a geographical location, and may determine an optimal or preferred route from each group member to the meeting point to gather the group members together optimizing for a particular parameter of interest.

20 Claims, 8 Drawing Sheets

(56) References Cited

U.S. PATENT DOCUMENTS

| | | |
|---|---|---|
| 2012/0123667 A1 | 5/2012 | Gueziec |
| 2012/0150379 A1 | 6/2012 | Day et al. |
| 2013/0080204 A1 | 3/2013 | Khorashadi et al. |
| 2015/0248651 A1* | 9/2015 | Akutagawa ........ G06Q 10/1095 705/7.19 |

OTHER PUBLICATIONS

"Google Maps," Accessed at http://web.archive.org/web/20050410000247/http://en.wikipedia.org/wiki/Google_Maps, last modified on Apr. 9, 2005, pp. 2.

"Mathematical optimization," Accessed at http://web.archive.org/web/20051215000000/http://en.wikipedia.org/wiki/Mathematical_optimization, last modified on Dec. 14, 2010, pp. 10.

"Simulated annealing," Accessed at http://web.archive.org/web/20031229033906/http://en.wikipedia.org/wiki/Simulated_annealing, last modified on Dec. 3, 2003, pp. 2.

"Waze," Accessed at http://web.archive.org/web/20100327034710/http://en.wikipedia.org/wiki/Waze, accessed on Sep. 3, 2014, pp. 2.

Etherington, D., "Apple Seeks Patent for Waze-Style Crowdsourced Navigation That Could Boost iOS Maps," accessed at http://techcrunch.com/2013/07/04/apple-seeks-patent-for-waze-style-crowdsourced-navigation-that-could-boost-ios-maps/, Jul. 4, 2013, pp. 1-5.

Gordon, W., "Turn Your Phone Into a Mind-Reading Personal Assistant," Accessed at http://web.archive.org/web/20121021204524/http://lifehacker.com/5950162/how-to-turn-your-phone-into-a-mind+reading-personal-assistant, Accessed on Sep. 3, 2014, pp. 7.

* cited by examiner

MEETING POINT DETERMINATION FOR GROUP MEMBERS

BACKGROUND

Unless otherwise indicated herein, the materials described in this section are not prior art to the claims in this application and are not admitted to be prior art by inclusion in this section.

Navigation systems provide wide ranging solutions for reaching a location from a departure point usually providing one or more paths for vehicles, pedestrians, public transformation passengers, and similar scenarios. Such systems may be commonly based on geographical features. For example, an automobile navigation system may compute available road combinations between two locations on a map. In computing the possible paths, a navigation system may attempt to optimize for distance, time, or traffic conditions. When a group of objects are involved, however, the point-to-point optimization may not be realized for every member of the group resulting in sub-optimal or even undesirable suggested paths. Furthermore, conventional navigation systems may be limited in terms of computation parameters to distance, time, and traffic conditions.

SUMMARY

The present disclosure generally describes techniques for coordination of group members at distinct locations to a meeting point or common path.

According to some examples, methods are described to coordinate group members at distinct locations to a meeting point. Example methods may include determining one or more travel parameters, designating members of the group as moving points, determining the meeting point for the moving points based on the one or more travel parameters, mapping the meeting point to a geographical location; and determining a route for each moving point from its current location to the geographical location corresponding to the meeting point.

According to other example, methods to coordinate a plurality of moving objects are described. Example methods may include determining a meeting point for the plurality of moving objects, based on one or more travel parameters, determining, for each moving object, a cost of travel to the meeting point based on the travel parameter, and determining, for each moving object, a route from the object's geographic location to a geographic location of the meeting point and a boundary based on the cost of travel.

According to further examples, a controller is configured to coordinate group members at distinct locations to a meeting point. The controller may include a communication module configured to communicate with the group members and a processor communicatively coupled to the communication module, where the processor may be configured to determine one or more travel parameters, designate members of the group as moving points, determine the meeting point for the moving points based on the one or more travel parameters, map the meeting point to a geographical location, and determine a route for each moving point from its current location to the geographical location corresponding to the meeting point.

According to yet other examples, systems are described to coordinate a plurality of moving objects. Example systems may include a communication module configured to communicate with group members, and a processor communicatively coupled to the communication module, where the processor may be configured to determine a meeting point for the plurality of moving objects, based on one or more travel parameters, determine, for each moving object, a cost of travel to the meeting point based on the travel parameter and determine, for each moving object, a route from the object's geographic location to a geographic location of the meeting point and a boundary based on the cost of travel. The systems may also include a location module configured to map the geographical location of the meeting point by use of one or more of global position system (GPS) coordinates, wireless local area network communications, and cellular tower signals.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
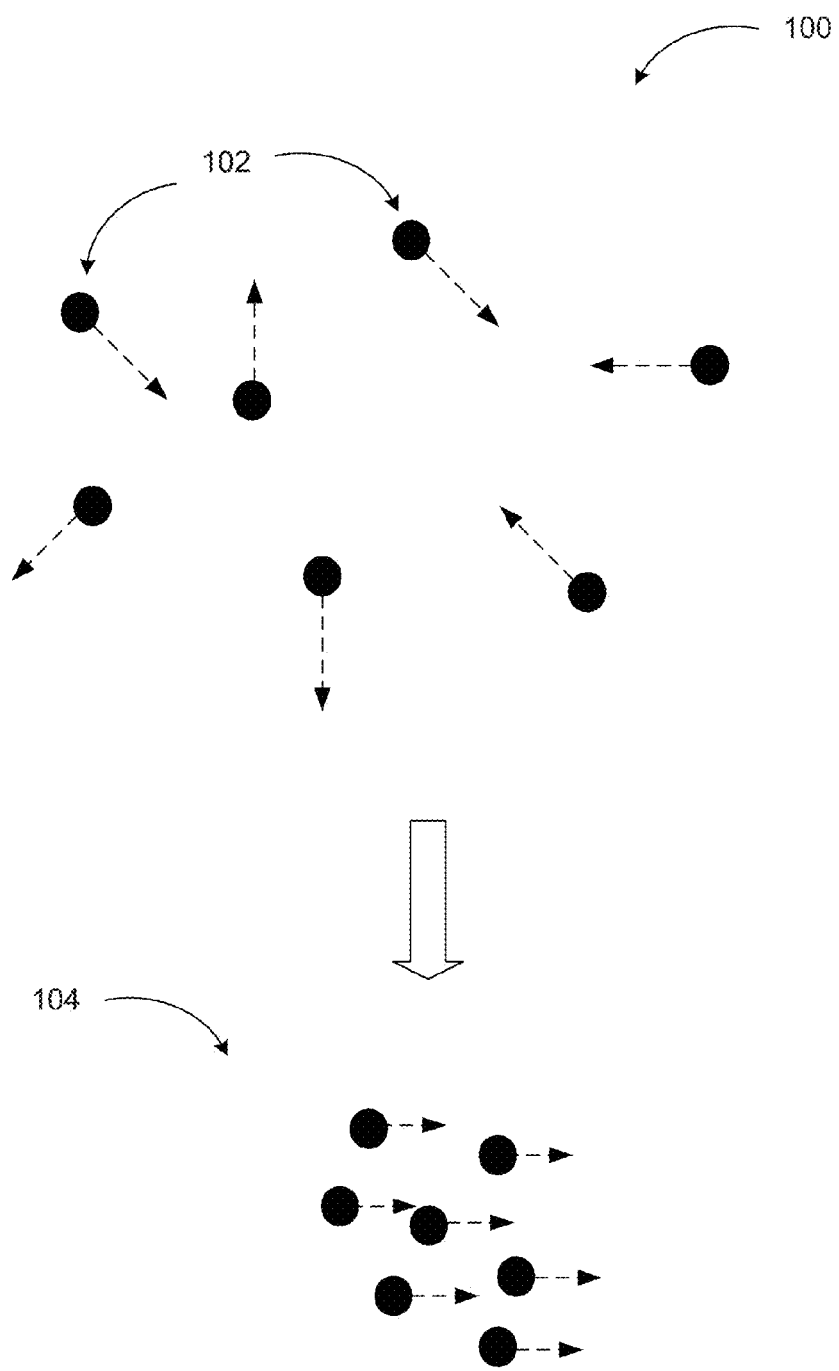
FIG. 1 illustrates an example of how group members that may be at distinct locations and optionally moving in distinct directions can meet at a coordinated meeting point and/or move in a common direction.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to coordination of group members at distinct locations to a meeting point or common travel path.

Briefly stated, technologies are generally described to coordinate group members that may be at distinct locations and optionally moving in distinct directions to meet at a coordinated meeting point and/or to move in a common direction. A coordinated meeting point may optimize a parameter of interest for each of the group members or group as a whole. Example parameters may include distance, time, fuel usage, remaining resource levels, a network coverage, and group members' patience, mood, and/or tiredness factors. In some examples, a controller may determine the meeting point that minimizes a parameter of interest for the group members or whole group, where the meeting point may be stationary or dynamic. The controller may map the calculated meeting point to a geographical location, and may determine an optimal or preferred route from each group member to the meeting point to gather the group members together optimizing for a particular parameter of interest.

FIG. 1 illustrates an example of how group members that may be at distinct locations and optionally moving in distinct directions can meet at a coordinated meeting point and/or move in a common direction, arranged in accordance with at least some embodiments described herein.

As shown in a diagram 100, one or more group members (for example, group members 102) are depicted as a multitude of dots, where each group member is at a distinct location and may be moving in a distinct direction from or relative to other group members 102. It may be desirable to cause the group members 102 to gather at or near a coordinated meeting point, and/or to move in a common direction towards a coordinated meeting point as shown in a diagram 104 of FIG. 1. In an example embodiment, the coordinated meeting point may be a meeting point that optimizes one or more parameters of interest for each of the group members 102. For example, the coordinated meeting point may enable the group members to gather in a minimal amount of time. In another example, the coordinated meeting point may be determined to minimize a distance traveled by each of the group members and/or the group as a whole. Other example parameters may include a fuel usage, remaining resource levels (for example, remaining water or remaining power level), a network coverage (including wireless and/or cellular networks), a group member's patience, irritancy, and/or tiredness factors, and a cost of time factor. The example parameters are not intended to be limiting, but are representative of parameters that may be taken into account when coordinating a group of members to converge at a coordinated meeting point.

Some example scenarios for when it may be useful or desirable to gather group members at a coordinated meeting point may include: organizing groups of people at a designated meeting place or within a designated gathering time, keeping vehicles within a particular distance, time and/or fuel consumption from a meeting point for vehicle service, coordinating decentralized group members to move along a selected route where the meeting point is a virtual point moving along a designated route, coordinating robotic devices exploring an area within a particular distance from a main route or point, keeping a group of devices within optimal network coverage or charging station, and coordinating drones within a selected time or distance from a main route or point. Another example scenario may include a group associated with a moving kitchen, where a kitchen may need to stop in a convenient location and may need preparation time before starting service. The kitchen may be designated as the meeting point, and group members may be notified to gather at the kitchen meeting point at a time that provides sufficient preparation time for kitchen service. A further example may be to coordinate one or more robotic devices within a range of each other for security purposes, where the robotic devices may communicate with each other with encryptions and/or security codes when the robotic devices are within a predefined range of each other or a defined meeting point. The example scenarios are not intended to be limiting, but are exemplary of situations of coordinating group members at a central gathering point.

Figure 2:
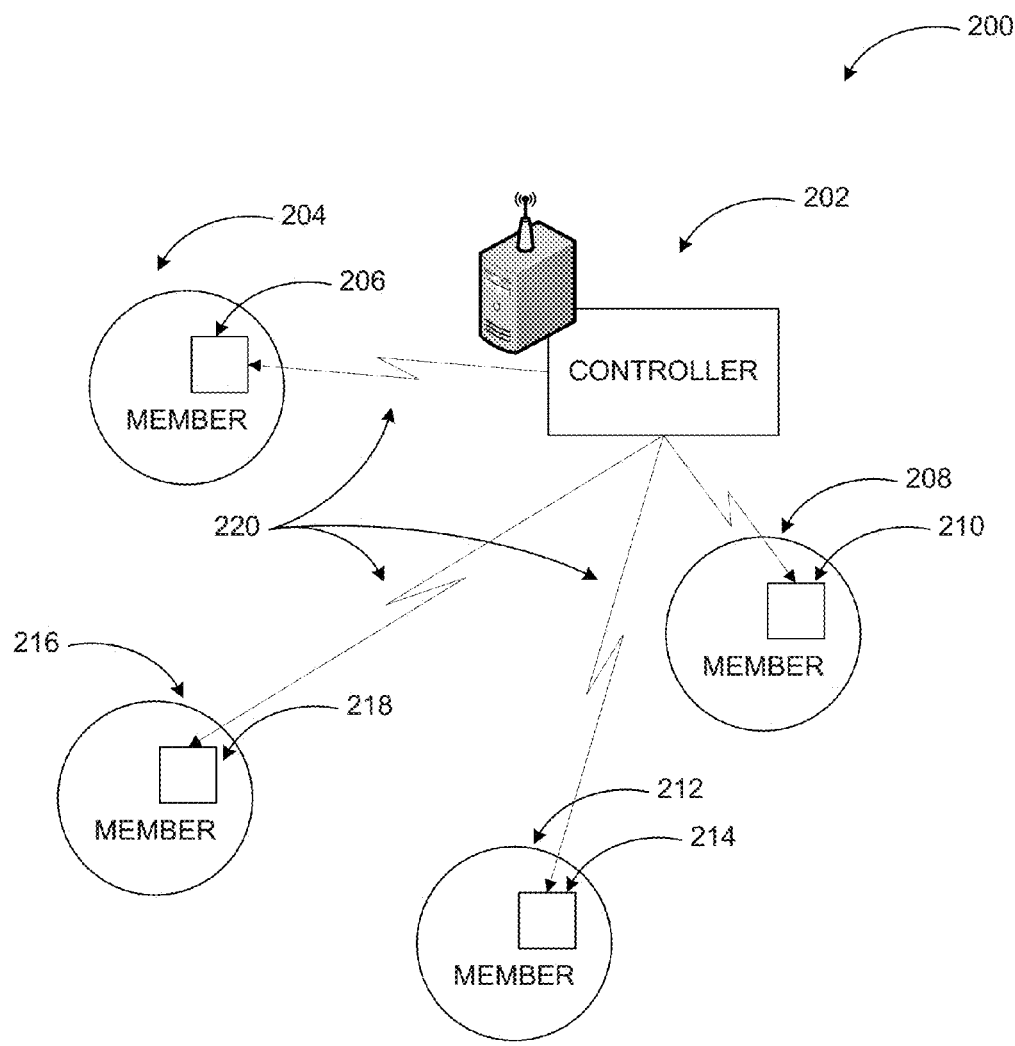
FIG. 2 illustrates an example communication system to enable group members at distinct locations to move to a coordinated meeting point.

FIG. 2 illustrates an example communication system to enable group members at distinct locations to move to a coordinated meeting point, arranged in accordance with at least some embodiments described herein.

As demonstrated in a diagram 200, a controller 202 may communicate (220) with one or more group members (for example, group members 204, 208, 212 and 216). The controller 202 may communicate with each of the group members 204, 208, 212, 216 employing a wireless communication device (for example, devices 206, 210, 214 and 218) associated with the group members 204, 208, 212, 216. An example communication device may include a cellular phone, a networked device, a tablet, a Bluetooth device, a navigation system, or other similar device configured to enable communication over a network.

In a system according to embodiments, the controller 202 may coordinate one or more group members to gather at a designated meeting point based on predefined parameters, as described herein. In an example embodiment, the group members 204, 208, 212, 216 may be designated as moving points, and a meeting point may be defined by the controller based on a parameter of interest. The meeting point may be a stationary point, or in other embodiments, the meeting point may be a dynamically moving route. In the case of a stationary meeting point, the meeting point may be determined based on a selected parameter. In the case of a meeting point on a dynamically changing route, the route may be predefined, or may be dynamically defined by movement and/or location of one of the group members.

In an example embodiment, the controller 202 may calculate the meeting point as a point that minimizes a parameter of interest for each of the moving points (that is, the group members 204, 208, 212, 216) to get to the meeting point. The controller 202 may map the calculated meeting point to a geographical location, and then determine an optimal or preferred route from each moving point to the calculated meeting point. The preferred route may be optionally adjusted or corrected by taking into consideration additional factors, such as a cost of traveling the route and/or obstacles or obstructions on the route. For example, a cost factor may weigh an importance and cost of a group member's time which can be incorporated as a factor to the parameter calculation. The technique for determining the meeting point and optimal preferred routes is described in further detail below.

After the controller 202 determines the preferred routes for each of the group members 204, 208, 212, 216 from their current locations to the meeting point, the controller 202 may communicate 220 with the group members 204, 208, 212, 216 to coordinate their gathering at the meeting point. In order to coordinate the gathering at the meeting point, the controller 202 may instruct the group members with an action to be performed. Some example actions may include, but are not limited to, communication of a route for each moving point to the meeting point and/or instruction of a navigation system associated with the group member for automatic routing to the meeting point. Additionally, the controller 202 may determine that one or more of the group members are outside of a preferred range from the meeting point based on the one or more of the parameters. In response to the determination that a group member is outside the preferred range, the controller 202 may perform one or more actions such as notify the group member, modify a route of the group member, remotely limit a capability of the group member to move in some directions, and/or take over control of a route of the group member. The action may be initiated directly by the controller 202 or, in other embodiments, the action may be initiated from a device associated with the group member outside the preferred range after receiving instructions from the controller 202.

In a further embodiment, the controller 202 may communicate (220) with the one or more group members 204, 208, 212, 216 to receive information about a parameter of interest, and to determine the meeting point and preferred routes based on the parameter. For example, the controller 202 may communicate with the one or more group members to receive location data associated with the group members, including altitude and terrain or topography data, time data, cost data, and resource data, such as fuel, power, and water consumption data. Furthermore, the controller 202 may communicate with the one or more group members to retrieve information related to personal parameters, such as a mood, tiredness, and/or an irritancy of a person. The person may be a driver of a vehicle within the group, a passenger of a vehicle within the group, a member of the group, etc. Personal parameters of the group members may be measured and determined through wearable devices on or worn by the one or more group members, for example. Example wearable devices may include smart glasses, smart watches, monitors and other smart wearable devices having a capability to measure personal parameters related to a human. Personal parameters of the group members may also be measured and determined through detection devices installed in a vehicle associated with a group member. The controller 202 may communicate 220 with the smart wearable devices and/or the detection devices to determine a personal parameter of interest.

An example scenario of taking personal parameters into account may be a group of people on a walking trip, where some people may be able to walk a while and enjoy the trip while others may be exhausted. A meeting time and location may be calculated that takes into account each of the group member's measured tiredness and optimizes a meeting point to satisfy the group as a whole. Additionally, route options that improve a person's mood may be considered as related to a chosen parameter. For example, a particular route having scenery that a person enjoys may be selected over other route options.

Figure 3:
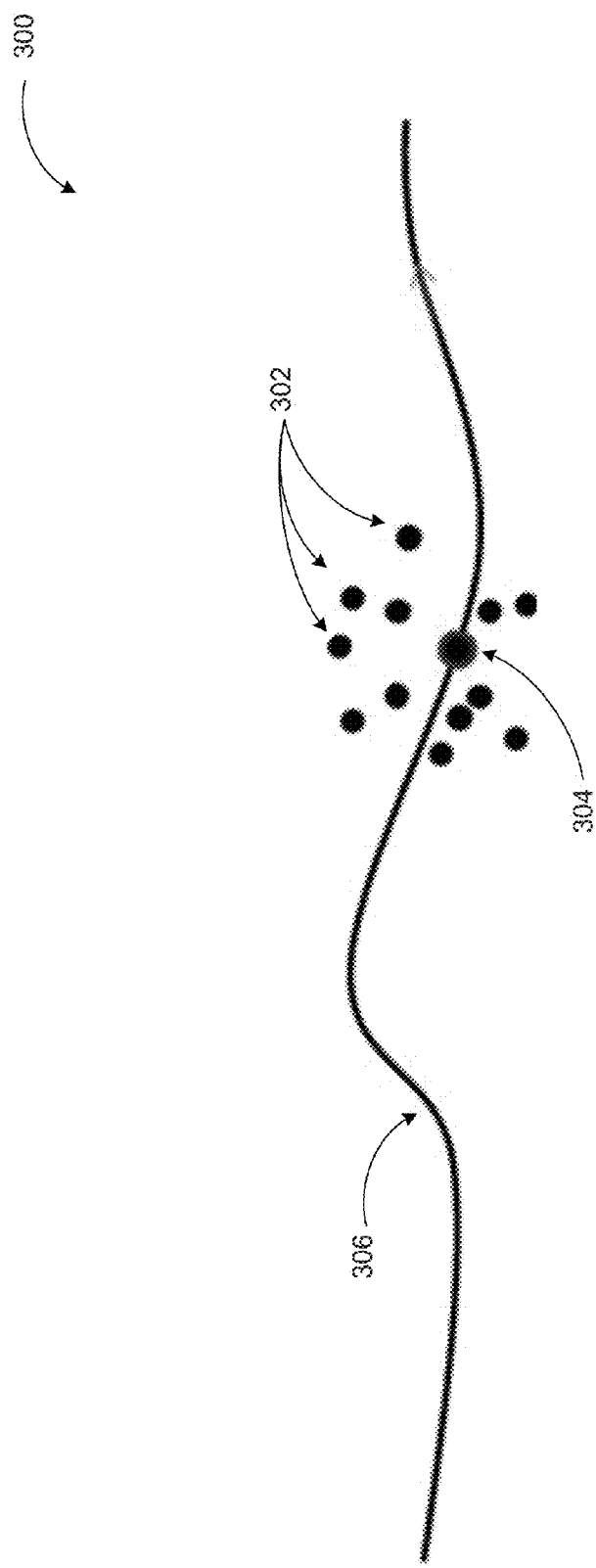
FIG. 3 illustrates an example of how group members' motion can be coordinated for common travel.

FIG. 3 illustrates an example of how group members' motion can be coordinated for common travel, arranged in accordance with at least some embodiments described herein.

As shown in a diagram 300, one or more group members 302 may be at distinct locations and moving in distinct directions relative to a meeting point 304 within an area. The meeting point 304 may be a stationary point, or may also be a dynamically moving point along a route 306. In the case of the stationary meeting point, the one or more group members 302 may be coordinated to gather at the meeting point 304 optimizing for a particular parameter. For example, the one or more group members 302 may be coordinated to gather together in a shortest amount of time. In the case of a dynamically moving meeting point 304 along the route 306, the group members 302 may be coordinated to move together along a route within a predefined range of the route 306 of the meeting point. If a group member is outside of the predefined range of the meeting point's route, an action may be performed to notify the group member that it is outside the range and to bring the route of the group member back inside the predefined range of the meeting point. The predefined range may be based on any parameter of interest, such as a predefined time, distance or remaining resource as described herein.

In an example embodiment for coordinating the group members 302 to gather at the meeting point 304, an external controller may designate the group members 302 as moving points on a plane, where the plane may be related to a parameter of interest, rather than a distance. The meeting point 304 may be calculated as a distance on the plane related to the parameter of interest on the plane that minimizes the parameter of interest for each of the moving points (or group members 302) to reach the meeting point 304. After calculation of the meeting point 304 relative to the parameter of interest, the meeting point 304 may be translated to physical geographical location on a map, enabling global position system (GPS) coordinates for the meeting point 304 to be extracted. Subsequently, an optimal route from each of the group members 302 to the meeting point 304 may be calculated. Approaches for calculation of the optimal route(s) are discussed in further detail below.

Figure 4:
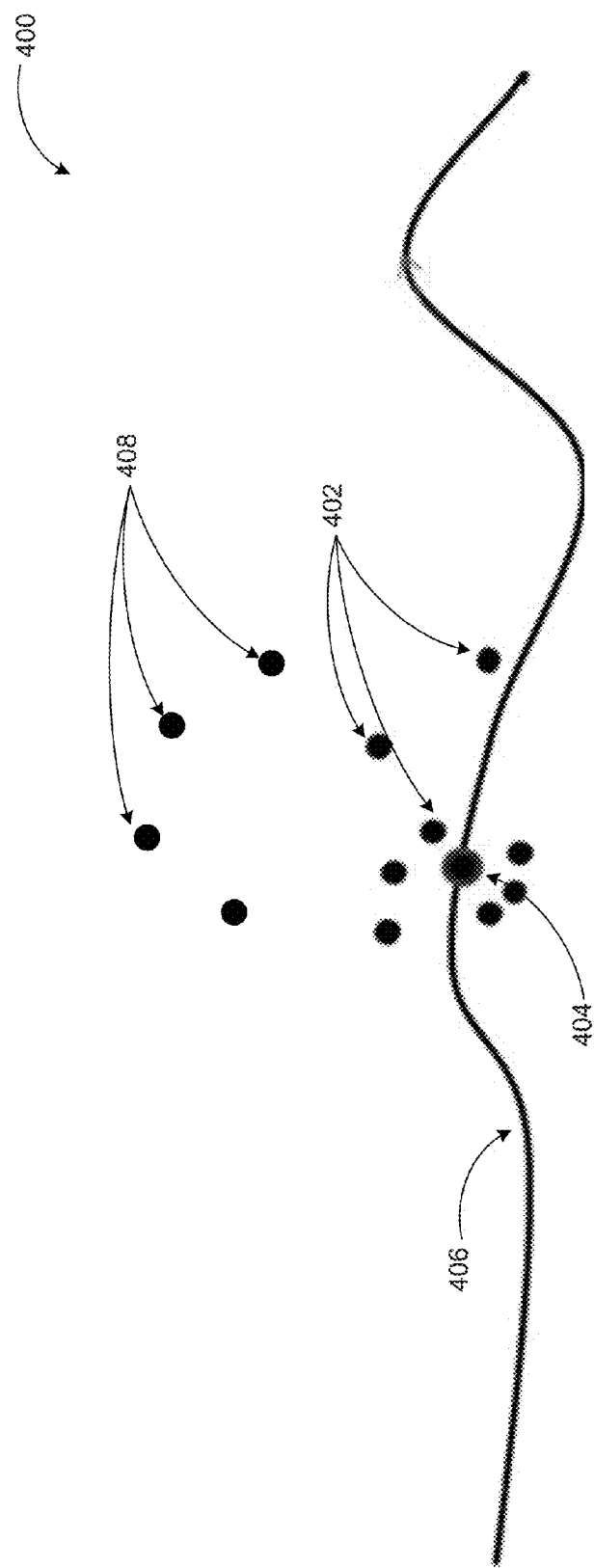
FIG. 4 illustrates another example of how group members' motion can be coordinated for common travel.

FIG. 4 illustrates another example of how group members' motion can be coordinated for common travel, arranged in accordance with at least some embodiments described herein.

As shown in a diagram 400, one or more group members 402 may be at distinct locations and moving in distinct directions relative to a meeting point 404 within an area. Some additional group members may be outside of a predefined range relative to the meeting point and are shown as out-of-range group members 408. The meeting point 404 may be a stationary point, and may also be a dynamically moving point along a route 406, as discussed above. In the case of a dynamically moving meeting point 404 along the route 406, the group members 402 may be coordinated to move together along a route within a predefined range of the meeting point's route. An example scenario may include moving a large decentralized group along a selected route, where the meeting point is a virtual point moving along a designated route and the meeting point can move with an average speed of the group or with a desired speed of the group among other options.

In an example embodiment for coordinating the group members 402 to move together relative to the route 406 of the dynamically moving meeting point, the meeting point may be characterized by properties including a route and a speed. The route may be predefined or may be a route of a selected group member or a selected point outside of the group, either exactly or with a defined offset. The group member route may be a function of the main route 406, and may not necessarily be linear. For example, in a scenario with a group of droids accompanied by a service robot which may be inspecting the droids, the service robot may have a route that is a function of a main route, but not a linear function. Likewise, the speed may be predefined or may be a speed of a selected group member or a selected point outside of the group, either exactly or with a defined offset.

An example of a selected point outside of the group may be a vehicle under surveillance, where the vehicle's route and speed define the route of the meeting point.

In an example optimal route determination calculation, an external controller may designate the group members 402 as moving points on a map, and may designate a meeting point, which may be one of the moving group members, or a predefined point as described above. For each moving point (or group member) the controller may calculate a time, distance, or other parameter of interest it takes to return to the meeting point. The controller may repeat the calculations continuously or periodically (e.g., once within a designated period of time). Subsequently, the controller may designate the location of each moving point and location boundaries related to the parameter of interest.

For some scenarios, such as when the parameter is independent of qualities of the moving points, the location boundaries may be determined such that the parameter of interest is within a threshold. The location boundaries may be calculated once and then communicated to the moving points. For other scenarios where the parameter of interest depends from the moving points' individual qualities, such as a speed or a resource consumption, the calculations may be performed for each moving point. The calculations may be performed by the controller and communicated to a device associated with the moving point, or alternatively, the calculations may be performed locally on the device associated with the moving point. After determination of the location of the moving points relative to the meeting point 404, the controller may identify the moving points, or group members, that are outside of the predefined range of the meeting point 404. The controller may perform an action on the out-of-range group members 408. Examples of actions include but are not limited to: communication to the out-of-range group members 408 that they are out of range, recording the identity of the out-of-range group members 408, remotely limiting those out of range group members' 408 capabilities to move in some directions, and taking over control of the movement of the out-of-range group members 408. The controller may limit the movement and take over control directly and/or locally on a device associated with the one or more out-of-range group members 408.

A parameter of interest in some embodiments may be a different parameter for different group members, including individual group members and/or subgroups including two or more group members. In an example scenario, the group may include vehicles of two types where one vehicle type is fast, mobile and limited in fuel, the second vehicle types are slow but not significantly limited in fuel. The first vehicle type may optimize for fuel usage and the second vehicle type for speed. Additionally, the parameter(s) of interest may also be a weighted sum of various parameters with optionally different weights for different group members. Furthermore, a parameter of interest may be changed dynamically while moving along a route. For example, there may be enough sun to enable a solar powered vehicle not to use fuel, so a fuel parameter may be removed and another parameter, such as speed, may become the parameter of interest.

A number of different approaches may be employed to facilitate calculation of optimal routes for coordinating the group members 402 to the meeting point 404. In each of the described approaches, each calculated optimal route may be an achievable route since the calculated optimal route is initially calculated based on paths relative to the parameter of interest that are available to each of the group members. If there is a case in which an approach calculates an unreachable meeting point, then the meeting point 404 may be identified as unreachable, and a closest point to the meeting point that is reachable may be identified and established as the meeting point, where "closest" may be defined by minimizing the same non-planar distance measure for all reachable points. Additionally, each of the described approaches may assume discrete moving paths for the objects in the approach, and the calculation of center point may be performed by iteration among these discrete paths. This assumption may apply in many scenarios such as when travel can be done only on existing roads, or pedestrian paths, or on ski runs for example.

In other cases, route alternatives may be continuous, rather than discrete, for example, pedestrians moving on a field, hiking in the mountains or skiing, where multiple routes may be available. In such cases, the continuous paths can be transformed into discrete paths, for example, by calculating a locally optimum path between any needed two points on a hyperplane in a multidimensional space (for example, an arbitrary plane in a three-dimensional space). The calculated locally optimum (discrete) paths may then be used in the following described approaches. Other existing approaches for mapping continuous paths into a discrete path can also first be used. For example, in another approach, each discrete optimum path calculated as above (as a local optimum) may be calculated on any one of a number of parameters as described herein, such as distance, time, a fuel usage, remaining resource levels, a network coverage, and group members' patience, mood, and/or tiredness factors. The parameter(s) used for this purpose may be different than the parameter(s) used subsequently to calculate the distance which may allow for a beneficial combination of optimization methods. Additionally, other approaches for mapping continuous fields into discrete paths may be first to choose equidistant paths from source to destination (with any desired step, and on any desired dimension), then define a grid of possible paths in the hyperplane, and then to define a network of points in the hyperplane that are linked by all possible connecting paths. A weighted sum of parameters may be used for the calculations of an optimum path, with optionally different weights for different group members of subgroups. Furthermore, optimality may be defined relative to the parameter of interest, for example, time, fuel, distance, patience, interest, and other similar parameters.

In the following described approaches, a map is built, where a distance on the map may represent a parameter of interest. For example, if the parameter of interest is fuel usage, then hills or congested areas may be represented as longer distances on the map than actual physical distances. Therefore, a scaled distance on the map may be any parameter such as miles, gallons of fuel, a cost of a resource, time, and/or an amount of power as some examples.

In a first example approach to determine an optimal route to a meeting point, an assumption may be made the base line is a map platform including all available route options, and all group members are located on the map.

---

Let M = a current approximation for the central meeting point. M is given an initial value ($M_0$) by choosing one of the group members at random or through any known seeding algorithm and taking his/her location.
Let S = a calculated distance function from all group members to meeting point, M.
Move M along a path away from an initial group member
do
{
    For each path in Paths, where Paths = a set of all possible paths, from M(current), do -continued

```
{
    S = calculated distance function from all group members to new
meeting point, M
        if S is better, move M further along path in same direction
        else, if S is worse move in other direction
        else, if S is worse in both directions, stop, as a local
optimum of the current path is found.
    }
    M = Take the best value (related to function S) from the values
received for all the paths
}
```

P may be a geometric representation of valid options for optimal central meeting point, M. Thus, every point, P, may be on one of the paths between the group members' initial locations, however, not every point on the paths between the group members' initial locations may be a valid candidate for point M. For example, if there is an obstacle in one direction between group members, then the path may be invalid. In the case of an obstruction or obstacle on a path, any path that is unreachable due to the obstruction or obstacle may be removed from the list of available paths. So, P may become a set of intervals with at least one of the ends in one of the group member's initial locations, and P can be built by calculating the valid paths between every pair of group members and then applying constraints, such as avoiding obstacles and/or removing paths having obstacles, to reduce the resulting set to available paths.

In another example approach, u and v may represent individual group members' initial locations, and P may be a set of intervals with at least one of the ends in one of the group member's initial locations. In a first option, for each interval (u, v) in P, start from point u and calculate for each point, i, on an interval $S_i$ until point v is reached. For each interval, take an optimal value of $S_i$ and its coordinate $M_i$. The interval is not discrete, so take points, i, on the interval $S_i$ with a reasonable step. The step may be different for different practical applications. Additionally, in some practical applications, this first option may be expensive in computational time, so a second optional approach may provide a less expensive approximation.

A second optional approach may be as follows:

```
For each interval (u, v) in P, do: {
Locate a random or calculated point $M_i$ on interval (u, v), where M = a
current approximation for the central meeting point.
Calculate $S_i$, where Si = a distance function from all group members to
a new central meeting point $M_i$, which may provide an initial (M, S) of
the
interval.
Move along the interval between (u,v) by examining neighboring points
within a defined step, proceeding in the direction of a point having a bet-
ter
S. do
{
    For each path in on the interval
    {
        S = calculate distance function from all group members to new
meeting point, M
            if S is better, move M further along path in same direction
            else, if S is worse move in other direction
            else, if S is worse in both directions, stop, as a local
optimum of the current path is determined.
    }
}
}
```

In practical cases, where a multitude of local optimums may exist, the procedure may be repeated several times for each interval, starting from a random point each time. After repeating, for each interval, j, a point ($S_j$, $M_j$) may be determined. An optimal distance, S, between the points ($S_i$, $M_i$) (for all intervals) may be determined, and a coordinate, M, corresponding to S may be the optimal central meeting point.

In other cases with a multitude of local optimums, a third approach may provide an approximation of a global optimum. In this option, a simulated annealing/genetic approach may be:

```
For each interval in P, find N points along this interval, number of points
N = 2.1 * number of group members, where the points are potential
meeting points. Determine a total "distance" or other parameter from
all members in the group to each of the points.
Do
{
    Keep 0.95*N/2 points with the smallest distance.
    Generate 0.95*N/2 new points, along the paths, between the above
points and one of the members' coordinates.
    Generate additional 5% of points on paths at random.
    Calculate a total "distance" or other parameter from all members in
the group to each of the new points.
}
Repeat the computation until a best point is unchanged for 5 iterations.
```

In the above described approach, the presented numbers are given as examples and may be tunable for particular practical cases. Additionally, the presented approaches are exemplary of possible approaches that may be used, but are not limiting, and other approaches may also be employed to determine an optimal meeting point and optimal routes for a given parameter of interest.

Figure 5:
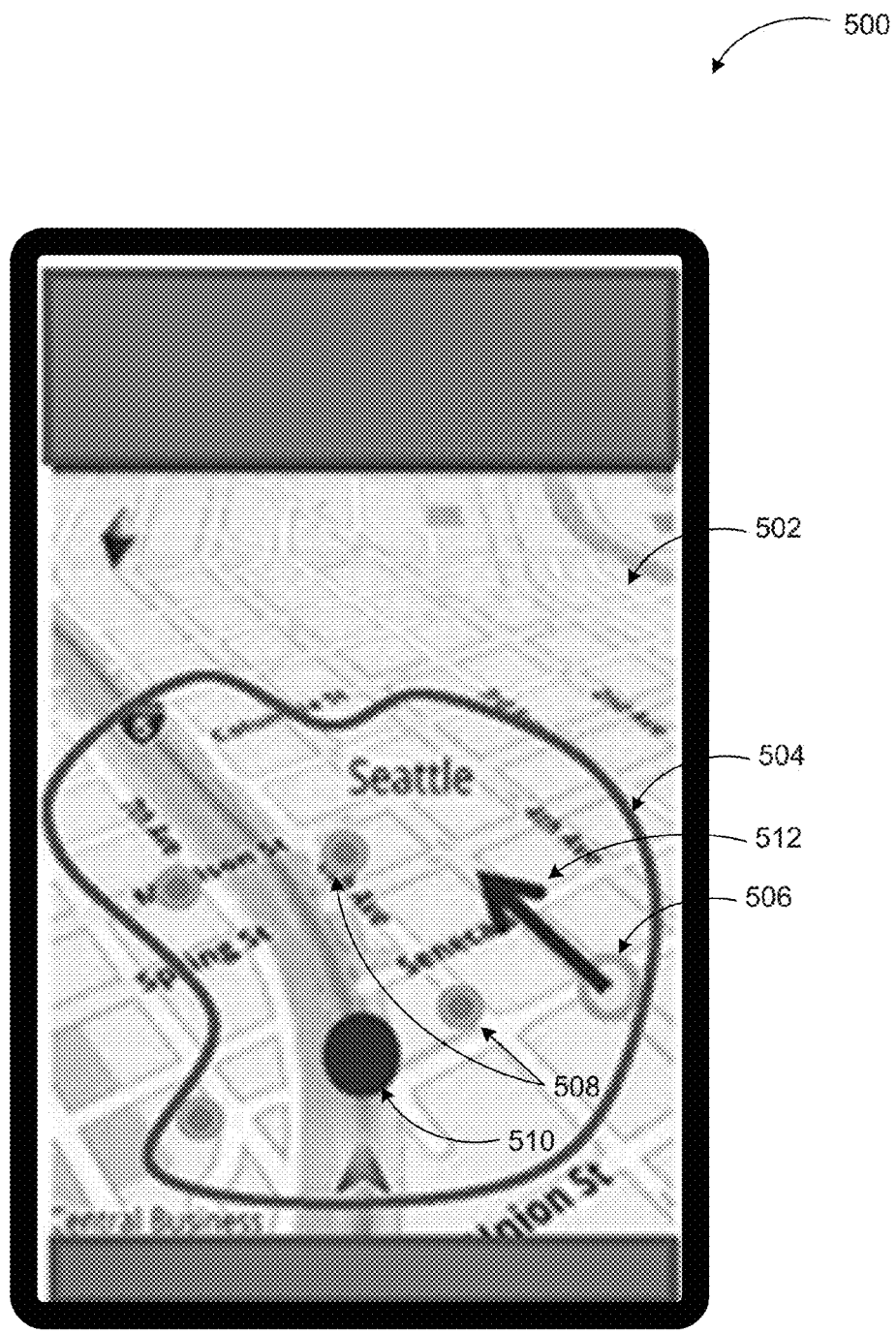
FIG. 5 illustrates an example user interface of a navigation system configured to move group members at distinct locations to a meeting point.

FIG. 5 illustrates an example user interface of a navigation system configured to move group members at distinct locations to a meeting point, arranged in accordance with at least some embodiments described herein.

A diagram 500 depicts a map 502 displayed through a navigation system on a user interface of a device. The map 502 shows a meeting point 510, a current group member's location 506 and an associated current navigation direction 512, one or more other group members 508 and their locations, and a boundary 504 representing an area related to the meeting point 510.

In an example embodiment, it may be necessary to calculate a time it takes to get from the current group member's location 506 or other group members' 508 locations to the meeting point 510. In urban areas, a navigation solution such as a mapping or navigation application may map the area and perform the calculations. However, many geographical areas may not be mapped by navigation solutions, and additionally, parameters other than distance, time, and traffic conditions may not be mapped by navigation solutions. For example, some areas not covered by current navigation systems may be open air areas, hiking trails, and areas after disasters or other ruined areas, where the maps have not been adjusted. In these cases, there may be no option to use pre-computed route information from a provided navigation solution, and approaches described herein may provide optimal routes to the meeting point 510 based on a predefined parameter of interest.

Figure 6:
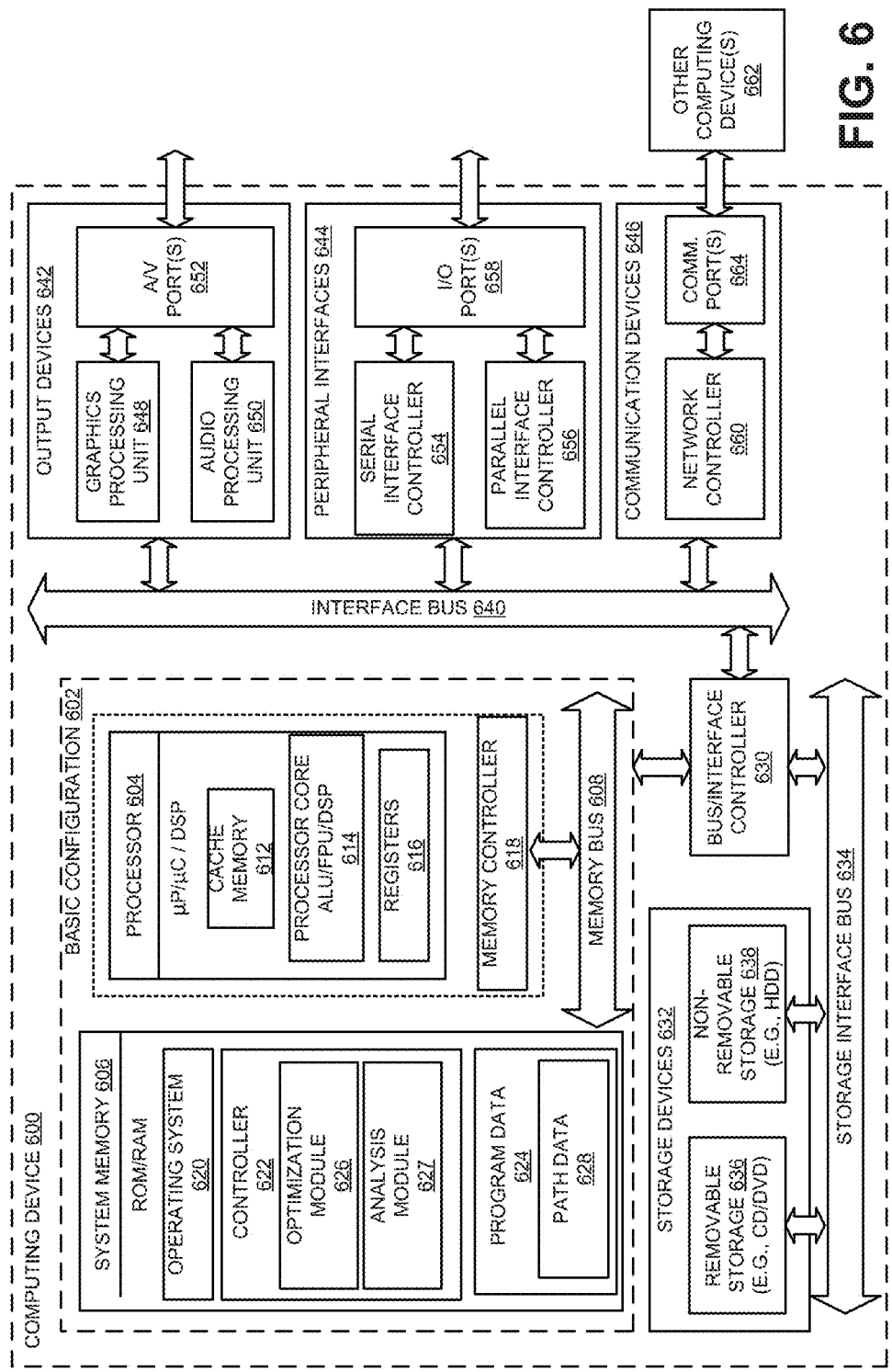
FIG. 6 illustrates a general purpose computing device, which may be used to coordinate group members at distinct locations to a meeting point.

FIG. 6 illustrates a general purpose computing device, which may be used to coordinate group members at distinct locations to a meeting point, arranged in accordance with at least some embodiments described herein.

For example, the computing device 600 may be used to implement coordination of group members at distinct locations to a meeting point as described herein. In an example basic configuration 602, the computing device 600 may include one or more processors 604 and a system memory 606. A memory bus 608 may be used to communicate between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one or more levels of caching, such as a cache memory 612, a processor core 614, and registers 616. The example processor core 614 may include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a control module 622, and program data 624, which may include path data 628. The control module 622 may include an optimization module 626 and an analysis module 627 to coordinate group members at distinct locations to a meeting point as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Figure 7:
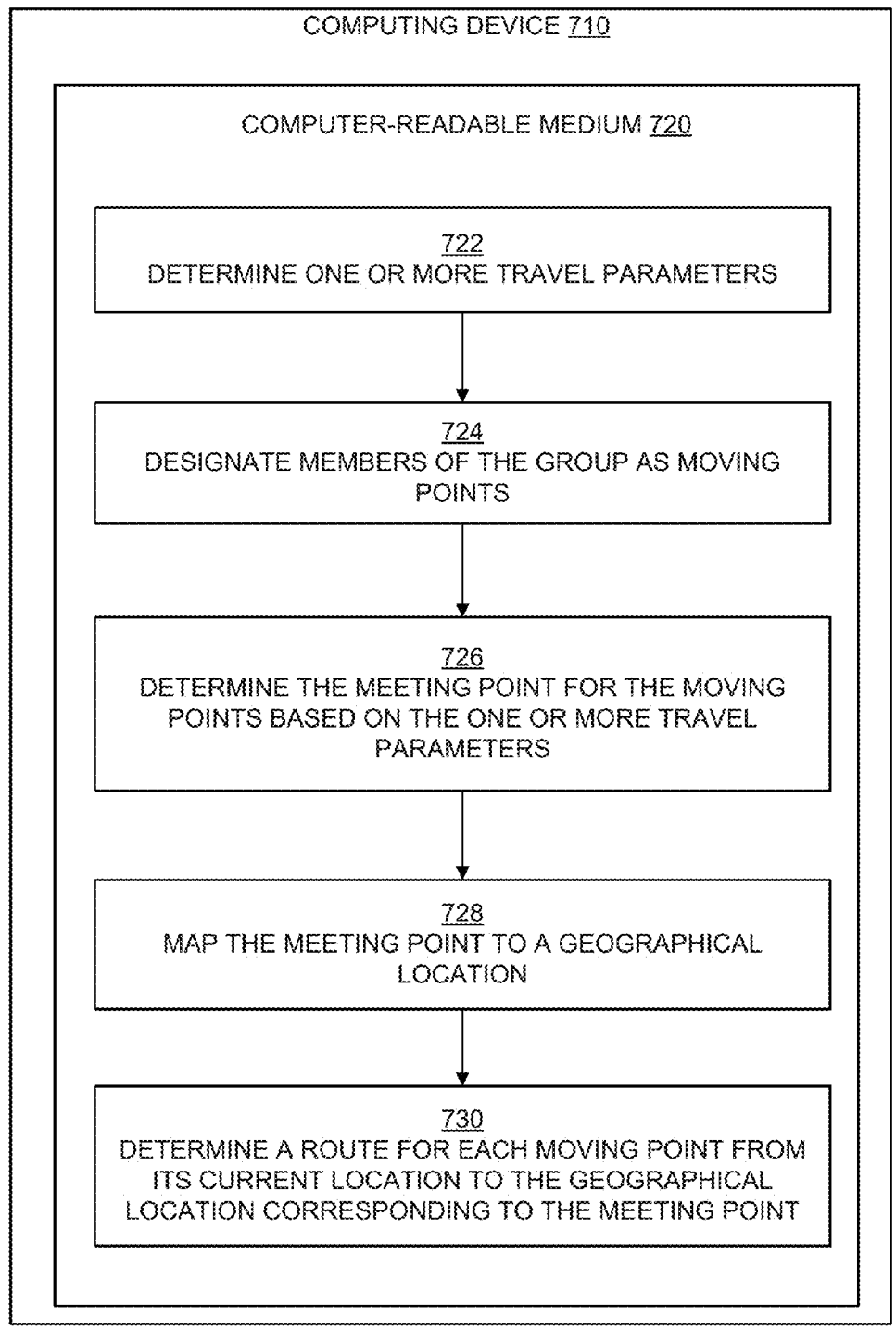
FIG. 7 is a flow diagram illustrating an example process to coordinate group members at distinct locations to a meeting point that may be performed by a computing device such as the computing device in FIG. 6.

FIG. 7 is a flow diagram illustrating an example method to coordinate group members at distinct locations to a meeting point that may be performed by a computing device such as the computing device in FIG. 6, arranged in accordance with at least some embodiments described herein.

Example methods may include one or more operations, functions or actions as illustrated by one or more of blocks 722, 724, 726, 728, and/or 730, and may in some embodiments be performed by a computing device such as the computing device 600 in FIG. 6. The operations described in the blocks 722-730 may also be stored as computer-executable instructions in a computer-readable medium such as a computer-readable medium 720 of a computing device 710.

An example process to coordinate group members at distinct locations to a meeting point may begin with block 722, "DETERMINE ONE OR MORE TRAVEL PARAMETERS,", where one or more travel parameters associated with members of a group may be identified in order to coordinate the group members to an optimal meeting point based on the travel parameters. Example travel parameters may include, but are not limited to, time, distance, fuel usage, remaining water, a mood of one or more of the group members, coverage of a geographic area by one or more of the group members, and/or a tiredness of one or more of the group members, as described above.

Block 722 may be followed by block 724, "DESIGNATE MEMBERS OF A GROUP AS MOVING POINTS," where the members of the group may be designated as moving points. Group members may include humans, drones, vehicles, or robotic equipment, as described herein.

Block 724 may be followed by block 726, "DETERMINE THE MEETING POINT FOR THE MOVING POINTS BASED ON THE ONE OR MORE TRAVEL PARAM- ETERS," where the meeting point for the group members may be determined based on the determined one or more travel parameters. The meeting point may be a point of conversion of the group members that minimizes a particular determined parameter for each of the moving points (that is, the group members). Additionally, the meeting point may be a stationary point, and may be a moving point.

Block 726 may be followed by block 728, "MAP THE MEETING POINT TO A GEOGRAPHICAL LOCATION," where the determined meeting point may be mapped to a geographical location which may be a location in three-dimensional space and includes an altitude. The geographical location may be mapped employing one or more of global position system (GPS) coordinates, wireless local area network communications, and cellular tower signals.

Block 728 may be followed by block 730, "DETERMINE A ROUTE FOR EACH MOVING POINT FROM ITS CURRENT LOCATION TO THE GEOGRAPHICAL LOCATION CORRESPONDING TO THE MEETING POINT," where a route for each of the moving points from each of the moving points' current locations to the meeting point is selected. The selected route may take into consideration obstacles or obstructions between the current location and the meeting point geographical location.

Figure 8:
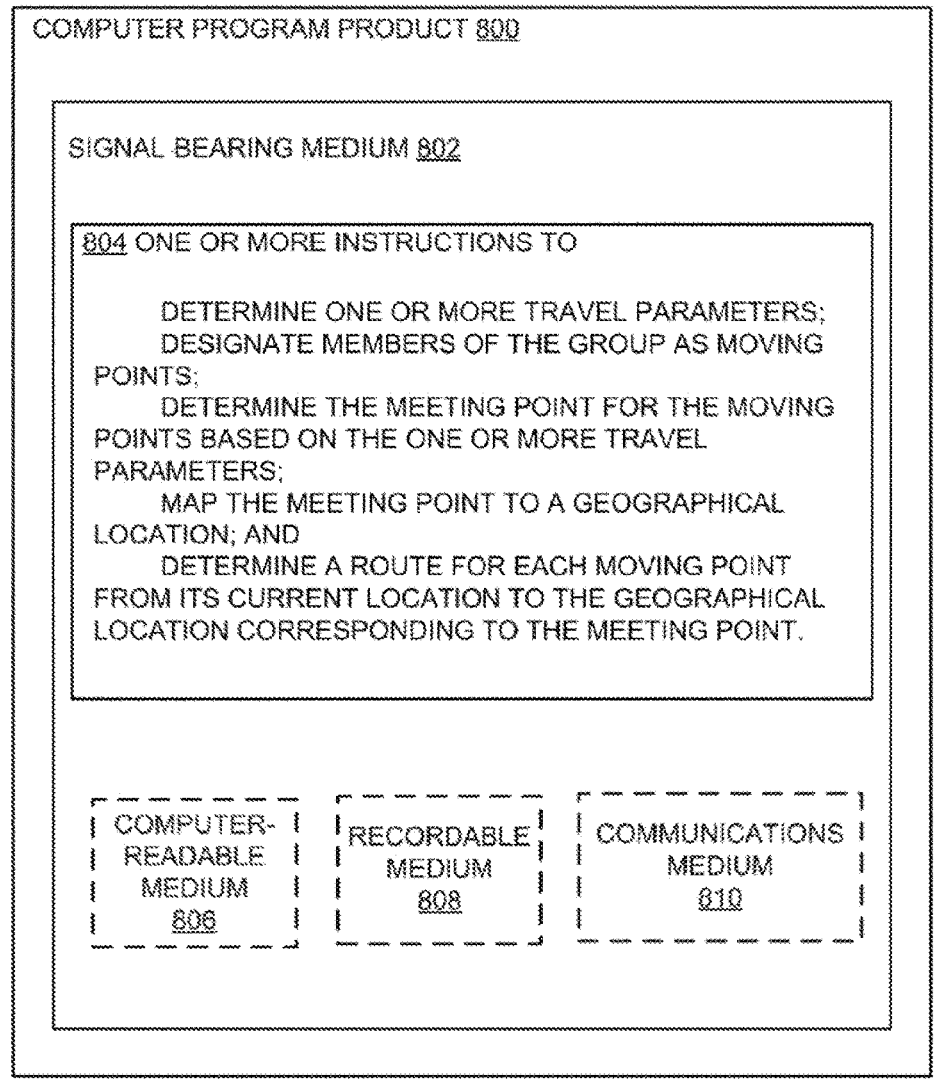
FIG. 8 illustrates a block diagram of an example computer program product, all arranged in accordance with at least some embodiments described herein.

FIG. 8 illustrates a block diagram of an example computer program product, arranged in accordance with at least some embodiments described herein.

In some examples, as shown in FIG. 8, a computer program product 800 may include a signal bearing medium 802 that may also include one or more machine readable instructions 804 that, when executed by, for example, a processor may provide the functionality described herein. Thus, for example, referring to the processor 604 in FIG. 6, the control module 622 may undertake one or more of the tasks shown in FIG. 8 in response to the instructions 804 conveyed to the processor 604 by the signal bearing medium 802 to perform actions associated with coordination of group members at distinct locations to a meeting point as described herein. Some of those instructions may include, for example, instructions to determine one or more travel parameters, designate members of a group as moving points, determine a meeting point for the moving points based on the one or more travel parameters, map the meeting point to a geographical location, and determine a route for each moving point from its current location to the geographical location corresponding to the meeting point, according to some embodiments described herein.

In some implementations, the signal bearing medium 802 depicted in FIG. 8 may encompass computer-readable medium 806, such as, but not limited to, a hard disk drive (HDD), a solid state drive (SSD), a Compact Disk (CD), a Digital Versatile Disk (DVD), a digital tape, memory, etc. In some implementations, the signal bearing medium 802 may encompass recordable medium 808, such as, but not limited to, memory, read/write (R/W) CDs, R/W DVDs, etc. In some implementations, the signal bearing medium 802 may encompass communications medium 810, such as, but not limited to, a digital and/or an analog communication medium (for example, a fiber optic cable, a waveguide, a wired communication link, a wireless communication link, etc.). Thus, for example, the computer program product 800 may be conveyed to one or more modules of the processor 604 by an RF signal bearing medium, where the signal bearing medium 802 is conveyed by the wireless communications medium 810 (for example, a wireless communications medium conforming with the IEEE 802.11 standard).

According to some examples, methods are described to coordinate group members at distinct locations to a meeting point. The method may include determining one or more travel parameters, designating members of the group as moving points, determining the meeting point for the moving points based on the one or more travel parameters, mapping the meeting point to a geographical location; and determining a route for each moving point from its current location to the geographical location corresponding to the meeting point.

According to some examples, the method may also include determining an altitude for the geographical location corresponding to the meeting point, where the route may be three dimensional. The one or more travel parameters may include time, distance, fuel usage, remaining water, a mood of one or more members of the group, coverage of a geographic area by one or more members of the group, a tiredness of one or more members of the group.

The method may also include determining the mood and/or the tiredness through wearable devices on the one or more members of the group and/or through detection devices installed in a vehicle associated with the one or more members of the group. The method may also include selecting the route for each moving point as a random path. The one or more members of the group may include humans, drones, vehicles, or robotic equipment.

According to some examples, determining the route for each moving point may include taking one or more obstructions on the route into consideration.

According to other examples, the method may also include communicating the route for each moving point to a corresponding member of the group or instructing a navigation system of each member of the group for automatic routing. The method may further include determining whether at least one moving point may be outside of a predefined range from the meeting point based on the one or more travel parameters.

According to some examples, the method may also include, in response to a determination that the at least one moving point may be outside of the predefined range, one or more of notifying a member of the group corresponding to the at least one moving point, modifying a route assigned to the at least one moving point, and remotely limiting a capability of the at least one moving point to move in one or more directions.

According to other examples, the method may also include dynamically re-determining the meeting point based on changing conditions associated with the one or more travel parameters for one or more members of the group.

According to some examples, the present disclosure also provides methods to coordinate a plurality of moving objects, where the methods may include determining a meeting point for the plurality of moving objects, based on one or more travel parameters, determining, for each moving object, a cost of travel to the meeting point based on the travel parameter, and determining, for each moving object, a route from the object's geographic location to a geographic location of the meeting point and a boundary based on the cost of travel.

In some examples, the one or more travel parameters may include time, distance, fuel usage, a mood of one or more members of the group, coverage of a geographic area by one or more members of the group, a tiredness of one or more members of the group. Additionally, the cost of travel may include one of remaining time, remaining distance, remaining fuel, remaining water, and an irritation factor associated with a person associated with each moving object. The geographic location of the meeting point may be the same as the geographic location of one of the objects.

According to some example methods, the meeting point may be moving along a path. The path may be one of predefined or determined from a path of one of the moving objects. The method may also include determining the path of the meeting point from the path of one of the moving objects by applying an offset. The method may further include determining the boundary for each object from one of the object's perspective or the meeting point's perspective.

According to further examples, the method may include, in response to a determination that an object may be outside the boundary, one or more of transmitting a communication to the object, designating the object as out of boundary, or remotely limiting a capability of the object to move in one or more directions.

According to other examples, the method may also include determining one or both of a speed and a path of the meeting point based on a speed and a path of one of the moving objects. The one of the moving objects may be a group leader.

According to further examples, the present disclosure provides a controller configured to coordinate group members at distinct locations to a meeting point. The controller may include a communication module configured to communicate with the group members and a processor communicatively coupled to the communication module, where the processor may be configured to determine one or more travel parameters, designate members of the group as moving points, determine the meeting point for the moving points based on the one or more travel parameters, map the meeting point to a geographical location, and determine a route for each moving point from its current location to the geographical location corresponding to the meeting point.

According to some examples, the controller may include a location module configured to map the meeting point to the geographical location by use of one or more of global position system (GPS) coordinates, wireless local area network communications, and cellular tower signals. The location module may be further configured to determine an altitude for the geographical location corresponding to the meeting point, where the route may be three dimensional.

According to some examples, the one or more travel parameters include time, distance, fuel usage, remaining water, a mood of one or more members of the group, coverage of a geographic area by one or more members of the group, a tiredness of one or more members of the group. The processor may be further configured to determine the mood and/or the tiredness based on input received from wearable devices on the one or more members of the group and/or from detection devices installed in a vehicle associated with the one or more members of the group. The processor may also be further configured to select the route for each moving point as a random path. The one or more members of the group may include humans, drones, vehicles, or robotic equipment.

According to further examples, the processor may be configured to determine the route for each moving point by taking one or more obstructions on the route into consideration. The processor may be further configured to communicate the route for each moving point to a communication module at a corresponding member of the group or instruct a navigation system of each member of the group for automatic routing. The processor may also be configured to determine that at least one moving point may be outside of a predefined range from the meeting point based on the one or more travel parameters.

According to further examples, the processor may be further configured to in response to the determination that the at least one moving point may be outside of the predefined range, one or more of: notify a member of the group corresponding to the at least one moving point, modify a route assigned to the at least one moving point, or remotely limit a capability of the at least one moving point to move in one or more directions. The processor may be further configured to dynamically re-determine the meeting point based on changing conditions associated with the one or more travel parameters for one or more members of the group.

According to further examples, the present disclosure describes systems to coordinate a plurality of moving objects. The system(s) may include a communication module configured to communicate with the group members, and a processor communicatively coupled to the communication module, where the processor may be configured to determine a meeting point for the plurality of moving objects, based on one or more travel parameters, determine, for each moving object, a cost of travel to the meeting point based on the travel parameter and determine, for each moving object, a route from the object's geographic location to a geographic location of the meeting point and a boundary based on the cost of travel. The system may also include a location module configured to map the geographical location of the meeting point by use of one or more of global position system (GPS) coordinates, wireless local area network communications, and cellular tower signals.

According to some examples, the one or more travel parameters include time, distance, fuel usage, a mood of one or more members of the group, coverage of a geographic area by one or more members of the group, a tiredness of one or more members of the group. The cost of travel may include one of remaining time, remaining distance, remaining fuel, remaining water, and an irritation factor associated with a person associated with each moving object. The geographic location of the meeting point may be the same as the geographic location of one of the objects.

According to some examples, the meeting point may be moving along a path, where the path may be one of predefined or determined from a path of one of the moving objects.

According to further examples, the processor may be further configured to determine the path of the meeting point from the path of one of the moving objects by applying an offset. The processor may be further configured to determine the boundary for each object from one of the object's perspective or the meeting point's perspective.

According to yet other examples, the processor may be further configured to in response to a determination that an object may be outside the boundary, one or more of transmit a communication to the object, designate the object as out of boundary, or remotely limit a capability of the object to move in one or more directions. The processor may be further configured to determine one or both of a speed and a path of the meeting point based on a speed and a path of one of the moving objects. The one of the moving objects may be a group leader.

Various embodiments may be implemented in hardware, software, or combination of both hardware and software (or other computer-readable instructions stored on a non-transitory computer-readable storage medium and executable by one or more processors); the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs executing on one or more computers (for example, as one or more programs executing on one or more computer systems), as one or more programs executing on one or more processors (for example, as one or more programs executing on one or more microprocessors), as firmware, or as virtually any combination thereof, and designing the circuitry and/or writing the code for the software and/or firmware are possible in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled. Also, the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, a solid state drive (SSD), etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. A data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. Such depicted architectures are merely exemplary, and in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to coordinate group members at distinct locations to a meeting point, the method comprising:
    determining travel parameters,
        wherein the travel parameters include a fuel usage, an amount of remaining water, and a coverage of a geographic area by one or more of the group members, wherein at least one of the travel parameters is determined based on input received from one or more detection devices installed in one or more vehicles associated with the one or more of the group members, and
        wherein the coverage of the geographic area by the one or more of the group members includes an altitude coverage and a distance coverage of the geographic area by the one or more of the group members;
    designating the group members as moving points,
    determining the meeting point for the moving points based on the travel parameters;
    mapping the meeting point to a geographical location;
    determining a route for each of the moving points from a current location of each of the moving points to the geographical location that is mapped to by the meeting point; and
    wirelessly communicating, a network controller the determined route for each of the moving points to a corresponding group member of the group members.

2. The method of claim 1, wherein the travel parameters are a weighted sum and additionally include a time to cover the geographic area by the one or more of the group members.

3. The method of claim 1, further comprising:
    instructing a navigation system of each of the group members for automatic routing.

4. The method of claim 1, further comprising:
    in responses to a determination, based on the travel parameters, that at least one of the moving points is outside of a range from the meeting point, one or more of:
        notifying one or more of the group members that correspond to the at least one of the moving point,
        modifying the route for the at least one of the moving points and
        remotely limiting a capability of the at least one of the moving points to move in one or more directions.

5. The method of claim 1, further comprising:
    re-determining the meeting point based on a modification to conditions associated with the travel parameters for the one or more of the group members.

6. A method to coordinate moving objects, the method comprising:
    determining a meeting point for the moving objects based on travel parameters,
        wherein the travel parameters include a fuel usage, an amount of remaining water, and a coverage of a geographic area by one or more of the moving objects, wherein at least one of the travel parameters is determined based on input received from one or more detection devices installed in one or more vehicles associated with the one or more of the moving objects, and
        wherein the coverage of the geographic area by the one or more of the moving objects includes an altitude coverage and a distance coverage of the geographic area by the one or more of the moving objects;
    determining, for each of the moving objects and based on the travel parameters, a cost of travel to the meeting point; and
    determining, based on the cost of travel, a route from a geographic location of each of the moving objects to a geographic location of the meeting point and a boundary.

7. The method of claim 6, wherein the travel parameters include a time to cover the geographic area by the one or more of the moving objects.

8. The method of claim 6, wherein the meeting point is moving along, a path.

9. The method of claim 6, wherein the boundary includes a first boundary, the method further comprising:
in response to a determination that an object of the moving objects is outside of a second boundary of one or more of a perspective of the object and another perspective of the meeting point, one or more of:
transmitting a communication to the object,
designating the object as out of the second boundary, and
remotely limiting a capability of the object to move in one or more directions.

10. The method of claim 6, further comprising:
determining one or more of a speed and a path of the meeting point based on a speed and a path of one of the moving objects.

11. The method of claim 10, wherein the one of the moving objects is a group leader.

12. A controller configured to coordinate group members at distinct locations to a meeting point, the controller comprising:
a communication module configured to communicate with the group members;
a processor communicatively coupled to the communication module, wherein the processor is configured to:
determine travel parameters,
wherein the travel parameters include a fuel usage, an amount of remaining water, and a coverage of a geographic area by one or more of the group members, wherein at least one of the travel parameters is determined based on input received from one or more detection devices installed in one or more vehicles associated with the one or more of the group members, and
wherein the coverage of the geographic area by the one or more of the group members includes an altitude coverage and a distance coverage of the geographic area by the one or more of the group members;
designate the group members as moving points;
determine the meeting point for, the moving points based on the travel parameters;
map the meeting point to a geographical location; and
determine a route for each of the moving points from a current location of each of the moving points to the geographical location that is mapped to by the meeting point,
wherein the communication module is further configured to communicate the route for each of the moving points to a corresponding group member of the group members.

13. The controller of claim 12, further comprising:
a location module communicatively coupled to the processor and to the communication module, and configured to map the meeting point to the geographical location by use of one or more of global position system (GPS) coordinates, wireless local area network communications, and cellular tower signals.

14. The controller of claim 12, wherein to determine the route for each of the moving points, the processor is configured to:
take one or more obstructions on the mute into consideration.

15. The controller of claim 12, wherein the processor is further configured to:
in response to a determination, based on the travel parameters, that at least one of the moving points is outside of a range from the meeting point, one or more of:
notify one or more of the group members that corresponds to the at least one of the moving points,
modify the route for the at least one of the moving points, or
remotely limit a capability of the at least one of the moving points to move in one or more directions.

16. A system to coordinate moving objects, the system comprising:
a communication module configured to communicate with the moving objects;
a processor communicatively coupled to the communication module, wherein the processor is configured to:
determine a meeting point for the moving objects based on travel parameters,
wherein the travel parameters include a fuel usage, an amount of remaining water, and a coverage of a geographic area by one or more of the moving objects, wherein at least one of the travel parameters is determined based on input received from one or more detection devices installed in one or more vehicles associated with the one or more of the moving objects, and
wherein the coverage of the geographic area by the one or more of the moving objects includes an altitude coverage and a distance coverage of the geographic area by the one or more of the moving objects;
determine, for each of the moving objects and based on the travel parameters, a cost of travel to the meeting point; and
determine, based on the cost of travel and for each of the moving objects, a route from a geographic location of each of the moving objects to a geographic location of the meeting point and a boundary; and
a location module communicatively coupled to the processor and to the communication module, and configured to:
map the geographical location of the meeting point by use of one or more of global position system (UPS) coordinates, wireless local area network communications, and cellular tower signals,
wherein the communication module is further configured to communicate the route for each of the moving objects to a corresponding moving object.

17. The system of claim 16, wherein the cost of travel includes an amount of remaining time associated with the coverage of the geographic area by the one or more of the moving objects.

18. The system of claim 16, wherein:
the meeting point is moving along a path, and
the path is either predefined from a path of one of the moving objects or determined from the path of the one of the moving objects.

19. The system of claim 18, wherein the processor is further configured to:
determine the path of the meeting point from the path of the one of the moving objects by application of an offset.

20. The system of claim 16, wherein the boundary includes a first boundary, and wherein the processor is further configured to:
in response to a determination that an object of the moving objects is outside of a second boundary from one of a perspective of the object of the moving objects or another perspective of the meeting point, one or more of:

transmit a communication to the object of the moving objects, designate the object as out of the second boundary, or remotely limit a capability of the object of the moving objects to move in one or more directions.

\* \* \* \* \*

UNITED STATES PATENT AND TRADEMARK OFFICE
CERTIFICATE OF CORRECTION

PATENT NO. : 9,689,695 B2  
APPLICATION NO. : 14/491937  
DATED : June 27, 2017  
INVENTOR(S) : Margalit et al.

Page 1 of 1

It is certified that error appears in the above-identified patent and that said Letters Patent is hereby corrected as shown below:

In the Claims

In Column 20, Line 9, in Claim 1, delete "moving points," and insert -- moving points; --, therefor.

In Column 20, Line 17, in Claim 1, delete "communicating, a network controller the" and insert -- communicating, via a network controller, the --, therefor.

In Column 20, Line 28, in Claim 4, delete "in responses to" and insert -- in response to --, therefor.

In Column 20, Line 33, in Claim 4, delete "moving point," and insert -- moving points, --, therefor.

In Column 20, Line 35, in Claim 4, delete "points and" and insert -- points, and --, therefor.

In Column 21, Line 2, in Claim 8, delete "along, a" and insert -- along a --, therefor.

In Column 21, Line 43, in Claim 12, delete "for, the" and insert -- for the --, therefor.

In Column 21, Line 64, in Claim 14, delete "the mute into" and insert -- the route into --, therefor.

In Column 22, Line 43, in Claim 16, delete "(UPS)" and insert -- (GPS) --, therefor.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*